H. S. DEPUTY.
GLASS CUTTING MECHANISM.
APPLICATION FILED APR. 18, 1919.
1,407,736.
Patented Feb. 28, 1922.
2 SHEETS—SHEET 2.
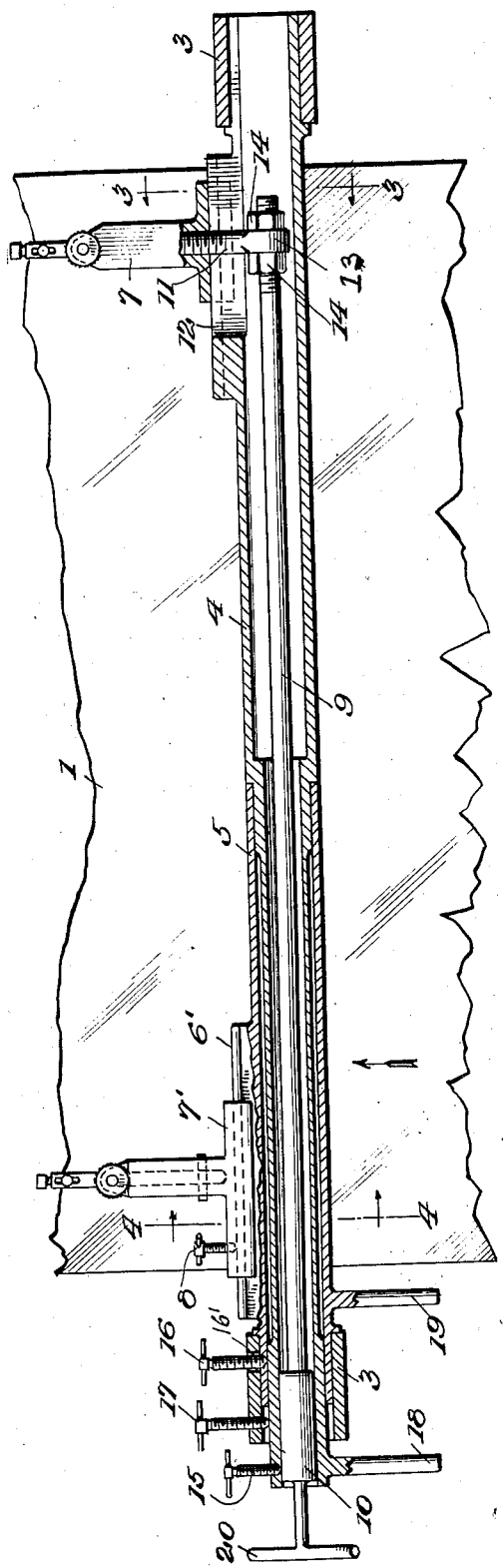

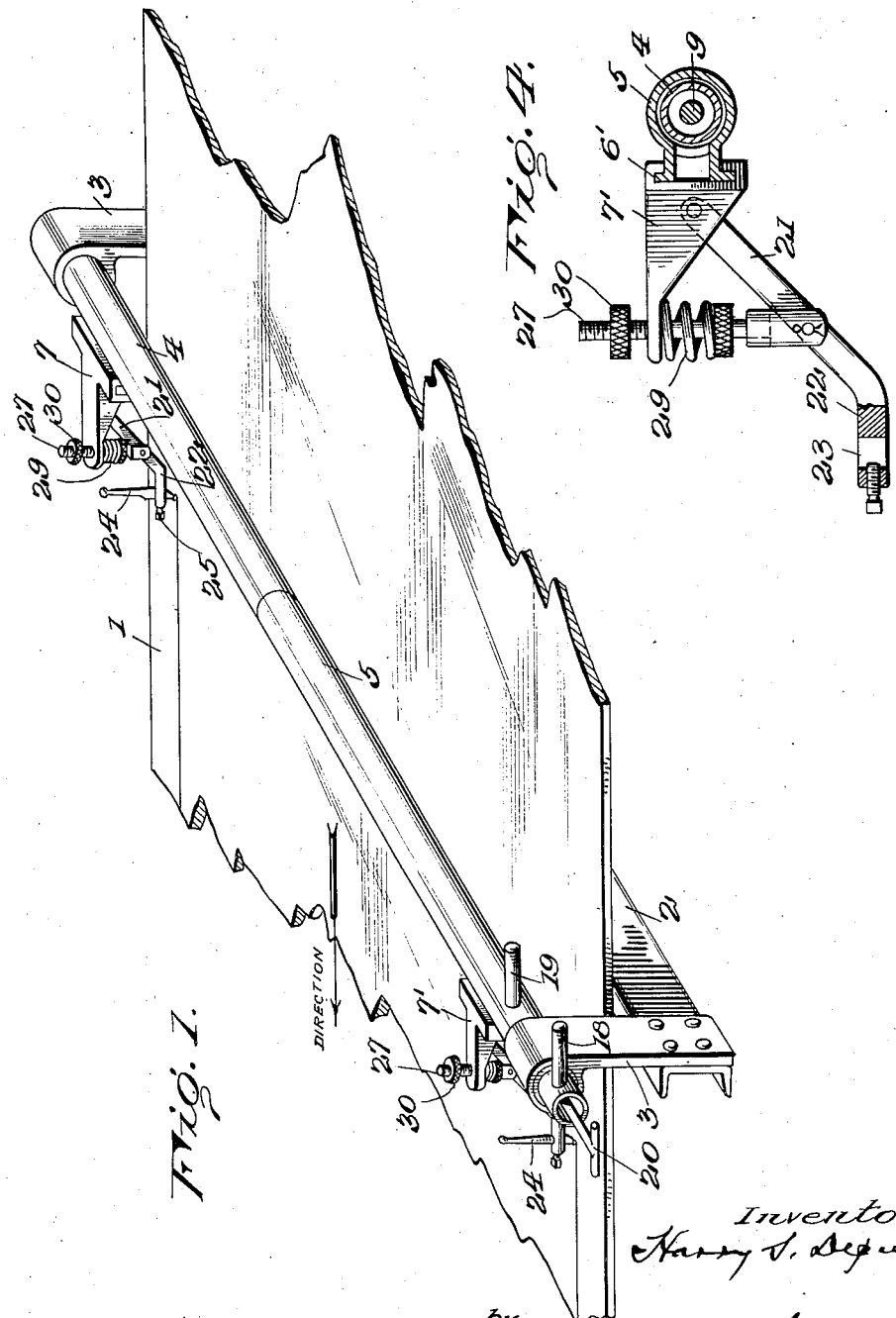

UNITED STATES PATENT OFFICE.

HARRY S. DEPUTY, OF CHARLESTON, WEST VIRGINIA, ASSIGNOR TO THE LIBBEY-OWENS SHEET GLASS COMPANY, OF TOLEDO, OHIO, A CORPORATION OF OHIO.

GLASS-CUTTING MECHANISM.

1,407,736.  Specification of Letters Patent.  Patented Feb. 28, 1922.

Application filed April 18, 1919. Serial No. 290,992.

*To all whom it may concern:*

Be it known that I, HARRY S. DEPUTY, a citizen of the United States of America, and a resident of Charleston, West Virginia, have invented a new and useful Improvement in Glass-Cutting Mechanism, which invention is fully set forth in the following specification.

This invention relates to the art of cutting sheet glass and has for its object to provide automatic means for scoring (or, as it is technically called, "cutting") sheets of glass automatically on a plurality of parallel lines as the sheet of glass is fed past the cutter, and to provide means whereby the operator standing on one side of the machine may adjust a plurality of cutters transversely of the sheet, perpendicularly to the sheet, and with relation to each other from a single operative station. While the device is capable of use in any structure where means is provided for advancing the sheet of glass past a cutting station, it is more particularly useful in continuous sheet glass drawing machines and is preferably placed at the point, or near the point, where the sheet of glass issues from the leer, though if desired it may be utilized for cutting or scoring the glass at any other suitable point.

In some sheet glass drawing machines, the sheet of glass, after being drawn, is passed through a leer and emerges therefrom on to a suitable table, at which point it is desirable to trim off the edge portions of the sheet and, for the purpose of illustration, the invention is herein illustrated as being applied for thus trimming off the edge portions, though it will be manifest that the same may be used for applying any longitudinal cut or score to the moving sheet of glass.

The inventive idea is illustrated in the accompanying drawings, which drawings, however, are for the purpose of illustration only and not for the purpose of defining the limits of the invention, reliance being placed on the claims hereto appended for this purpose.

In said drawings—

Fig. 1 is a perspective view of the apparatus in operative relation with a sheet of glass.

Fig. 2 is a horizontal transverse sectional plan, the section being taken centrally through the hollow shafting connecting the parts.

Fig. 3 is a vertical section on the line 3—3 of Fig. 2.

Fig. 4 is a vertical section on the line 4—4 of Fig. 2.

In said drawings 1 indicates a sheet of glass advanced in the direction of the arrow by any suitable means, which (since such means forms no part of the present invention) are not illustrated. 2 is a part of the framework of the machine, and 3—3 are bracket arms bolted or otherwise secured to the frame of the machine and provided at their upper ends with bearings as shown. 4 is a tubular supporting shaft, one end of which, here shown as the right hand end, turns in one of the bearings 3; and 5 is a sleeve extending approximately half way along the shaft 4 and taking bearing in the other bracket 3. At each end said sleeve is capable of sliding upon and of turning upon a reduced portion of shaft 4, as will be understood from an inspection of Fig. 2, said sleeve 5 and the unreduced portion of shaft 4 being preferably of the same exterior diameter. On shaft 4 there is provided a tongued or flanged guideway 6, Fig. 3, and on sleeve 5 there is provided a corresponding guideway 6'. Mounted on the guideway 6 is a bracket 7, and on the guideway 6' is a bracket 7'. The bracket 7' is provided with a set screw 8, by means of which it is fixed in position upon the guideway 6'.

Extending through hollow shaft 4 is a rod 9 having a bearing 10 in the outer end of said shaft, see Fig. 2, having its inner end within the shaft 4 at a point opposite bracket 7. Secured to said inner end of rod 9 is a lug 11, preferably in the form of a screw projecting through a slot 12 in the end of shaft 4 and into bracket 7. Said lug is provided with an eye 13, through which the inner end of rod 9 passes and to which it is secured by nuts 14, by which nuts the position of lug 11 may be adjusted on the end of rod 9.

At its outer (that is, its left hand) end, Fig. 2, a set screw 15 passes through the hollow shaft 4 into engagement with the enlarged bearing part 10 of rod 9, whereby the two parts are effectively secured together.

The sleeve 5 is secured to hollow shaft 4 by a set screw 16 mounted in sleeve 5 and passing through a slot 16' in the outer or left hand bearing 3 (of Fig. 2), and said hollow shaft 4 is rigidly secured in position in said bearing 3 by a set screw 17.

Hollow shaft 4 is provided with a handle 18, sleeve 5 with a handle 19, and rod 9 with a handle 20.

Referring to Figs. 2 and 4, on each of the brackets 7 and 7', there is pivotally mounted a lever 21 extending downward from said bracket, and, at a point near the surface of the glass, this lever is provided with a horizontal arm 22, having an opening 23, in which any suitable glass-cutting or scoring device 24 is mounted, being secured in position by a set screw 25. As here shown said glass-cutting or scoring device 24 is the common glass cutter's tool, provided with a scoring wheel 26.

Pivotally secured to the inclined arm of lever 21 is a pin 27 projecting upward through the outer end of bracket 7. The upper portion of said pin is reduced and screw threaded, and a nut 28 is mounted thereon so as to confine a spring 29 between said nut and the lower face of bracket 7. An additional nut 30 is located on the upper end of rod 27 above bracket 7. By this construction, lever 21 and with it glass cutter 24 are yieldingly secured to the bracket 7. Pin 27 passes through bracket 7 loosely to the end that there may be a slight amount of play between said pin and the bracket. It will be understood that the mounting of the cutter 24 upon bracket 7' is the same as that of the mounting for the cutter on bracket 7.

Operation: In order to adjust bracket 7 into the desired position transverse to the sheet, the operator loosens set screw 15 and by grasping handle 20 he is able to move rod 9 through hollow shaft 4, thus adjusting bracket 7 on flange 6. The proper adjustment being secured, set screw 15 is tightened and bracket 7 held in its adjusted position.

In order to adjust bracket 7' transversely of the sheet, set screw 8 is loosened and bracket 7' slid along way 6' to the desired position, and set screw 8 is tightened. By loosening set screw 16, sleeve 5 may be adjusted around the axis of hollow shaft 4 through the use of handle 19 until bracket 7' occupies the desired radial relation to shaft 4, when set screw 16 is tightened to retain its adjustment.

The parts being thus adjusted, the operator, by loosening set screw 17, is enabled to turn the entire structure in the bearings 3—3 around the axis of shaft 4 by grasping handle 18. By this adjustment the entire supporting structure can be turned so as to throw the cutters upward out of contact with the sheet of glass, in which position they can be held by again tightening set screw 17, and, when it is desired to place the cutters in operation, the set screw can be loosened and the device manipulated through handle 18 to throw the cutters down into operative position shown in Fig. 1, the cutters being brought firmly but yieldingly into contact with the glass and set screw 17 again tightened. In this position of the parts the glass will be scored as it advances under the cutters in the direction indicated by the arrows.

It will be observed that all of the operations of adjusting the individual cutters, either transversely of the sheet or around the axis of shaft 4, as well as those of throwing the cutters into or out of operation, can be performed by the operator standing at the left hand side of Fig. 2 without moving from his position.

While, as here shown, the cutters are set for producing longitudinal scores near the edge portions of the sheet, it will be apparent to any one skilled in the art that the same can be mounted on hollow shaft 4 and sleeve 5 so as to score the sheet on any particular line between its sides that may be desired.

Having thus described my invention, what is claimed is:

1. In a sheet glass scoring device, an axial support, a cutter mounted on said support, means for adjusting the cutter longitudinally of the support, and means for adjusting the support and cutter circumferentially, both means being operative from one end of the support.

2. In a sheet glass scoring device, an axial support, a plurality of cutters mounted on the support, the cutters being adjustable longitudinally of the support and circumferentially with the support, and means for accomplishing all of the adjustments from one end of the support.

3. In a sheet glass scoring device, an axial support, a plurality of brackets mounted on the support, and a cutter carried by each bracket, the brackets being adjustable longitudinally of the support and circumferentially with the support, and means for accomplishing all of the adjustments from one end of the support.

4. In a sheet glass scoring device, the combination of a support, bearings in which said support is mounted to turn, a plurality of cutters mounted for transverse adjustment along said support, means securing said cutters in their adjusted positions, and means securing said support in its adjusted positions.

5. In a sheet glass scoring device, the combination of a support, bearings in which said support is mounted to turn, a plurality of cutters mounted for transverse adjustment on said support, means securing said cutters in their adjusted positions, and means securing said support in its adjusted positions.

6. In a sheet glass scoring device, the combination of a shaft, bearings in which said shaft is mounted to turn, a plurality of cutters adjustable longitudinally along said shaft, means securing said cutters in their adjusted positions, and means for locking said shaft in its bearings.

7. In a sheet glass scoring device, the combination of a hollow shaft, a cutter slidably mounted on said shaft, a rod within said shaft connected at one end to said cutter and having the other end projecting from the shaft, and means detachably securing said rod and shaft together.

8. In a sheet glass scoring device, the combination of a hollow shaft, a cutter slidably mounted on said shaft, a sleeve rotatably mounted on said shaft, a cutter slidably mounted on the sleeve, means securing said cutter to the sleeve and the latter to the shaft, a rod within the shaft and secured to the first mentioned cutter, and means securing said rod and shaft together.

9. In a sheet glass scoring device, the combination of a hollow shaft, bearings in which said shaft is mounted, means locking said shaft in its bearings, with a plurality of cutters slidably mounted on said shaft, and means locking said cuttters in position on the shaft.

10. In a sheet glass scoring device, the combination of a support, a cutter pivotally connected to said support, and a yielding tension device operating between said cutter and its pivot and permitting limited movement of said cutter around the axis of said support.

11. In a sheet glass scoring device, the combination of a shaft, bearings in which said shaft is mounted, a plurality of transversely adjustable cutters pivotally connected to said shaft, and yielding devices operating between said cutters and their pivots and permitting a limited movement of said cutters around the axis of said shaft.

12. In a sheet glass scoring device, a hollow shaft, bearings adjacent the ends of said shaft in which said shaft is mounted to turn, a cutter mounted adjacent one end of the shaft, means operable from the other end of the shaft for adjusting this cutter longitudinally of the shaft, a sleeve mounted on the last mentioned end of the shaft, a cutter longitudinally adjustable along the sleeve, means for adjusting the sleeve and cutter circumferentially of the shaft and means for securing the sleeve in adjusted position, means for adjusting the assembled shaft, sleeve and cutters as a unit circumferentially, and means for securing this assembly in adjusted position.

13. In a sheet glass scoring device, a rotatable supporting means, a cutter mounted on the support and adjustable longitudinally of and circumferentially with the support, a sleeve circumferentially adjustable on the support, a cutter adjustable longitudinally of and circumferentially with the sleeve, and means for adjusting the support circumferentially and securing it in adjusted position.

14. In a sheet glass scoring device, an axial supporting means capable of circumferential adjustment, cutters carried by and independently adjustable along the supporting means, and devices for accomplishing these adjustments, all operable from one end of the supporting means.

In testimony whereof I have signed this specification.

HARRY S. DEPUTY.